(12) United States Patent
Willers et al.

(10) Patent No.: US 12,360,030 B2
(45) Date of Patent: Jul. 15, 2025

(54) METHOD AND APPARATUS FOR MEASURING A RECEDING CONTACT ANGLE

(71) Applicant: KRÜSS GmbH, Wissenschaftliche Laborgeräte, Hamburg (DE)

(72) Inventors: Thomas Willers, Hamburg (DE); Katrin Oetjen, Schenefeld (DE)

(73) Assignee: KRÜSS GmbH, Hamburg (DE)

( * ) Notice: Subject to any disclaimer, the term of this patent is extended or adjusted under 35 U.S.C. 154(b) by 304 days.

(21) Appl. No.: 17/846,108

(22) Filed: Jun. 22, 2022

(65) Prior Publication Data

US 2022/0412863 A1 Dec. 29, 2022

(30) Foreign Application Priority Data

Jun. 24, 2021 (EP) .................................... 21181439

(51) Int. Cl.
*G01N 13/02* (2006.01)
(52) U.S. Cl.
CPC ..... *G01N 13/02* (2013.01); *G01N 2013/0208* (2013.01)
(58) Field of Classification Search
CPC ..................... G01N 13/02; G01N 2013/0208
USPC ....................................................... 73/64.52
See application file for complete search history.

(56) References Cited

U.S. PATENT DOCUMENTS

2010/0024529 A1 2/2010 Dillingham et al.
2020/0080880 A1* 3/2020 Dillingham .......... G01B 11/255

FOREIGN PATENT DOCUMENTS

| EP | 2899528 A1 * | 7/2015 | ............. G01N 13/02 |
| EP | 3210004 A1 | 8/2017 | |
| WO | 2016065369 A1 | 4/2016 | |

OTHER PUBLICATIONS

Contact Angle Measurement Apparatus (Year: 2015).*
Jin et al., Replacing the Solid Needle by a Liquid One When Mesauring Static and Advancing Contact Angles, Colloid and Polymer Science (2016), ISSN 0303-402X, vol. 294, No. 4. pp. 657-667 (11 pages).
Huhtamäki, T., Tian, X., Korhonen, J.T. et al. Surface-wetting characterization using contact-angle measurements. Nat Protoc 13, 1521-1538 (2018).

\* cited by examiner

*Primary Examiner* — Peter J Macchiarolo
*Assistant Examiner* — Rodney T Frank
(74) *Attorney, Agent, or Firm* — Barclay Damon LLP

(57) ABSTRACT

A method for measuring a receding contact angle between a sample surface and a drop of a liquid is provided. The method includes ejecting a dosing volume of the liquid from an opening onto the sample surface such that the liquid is ejected as a continuous jet at a defined flow rate for a defined dosing time period, and the opening comprises an opening diameter. The dosing volume of the liquid is allowed to form a drop on the sample surface. At least one geometrical parameter of the drop formed on the sample surface is measured and a contact angle between the sample surface and the drop is determined based on the at least one geometrical parameter. The flow rate and the dosing time period are selected such that the dosing volume does not exceed the flow rate multiplied by 0.11 s.

14 Claims, 6 Drawing Sheets

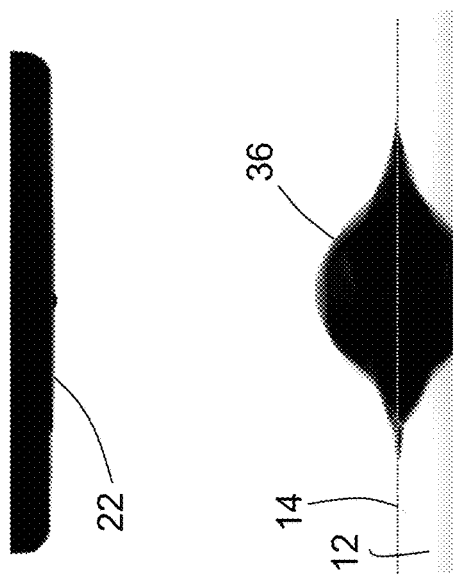
Fig. 2a
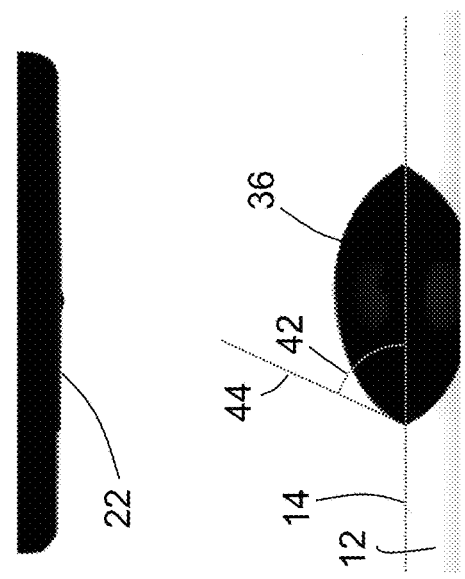
Fig. 2b
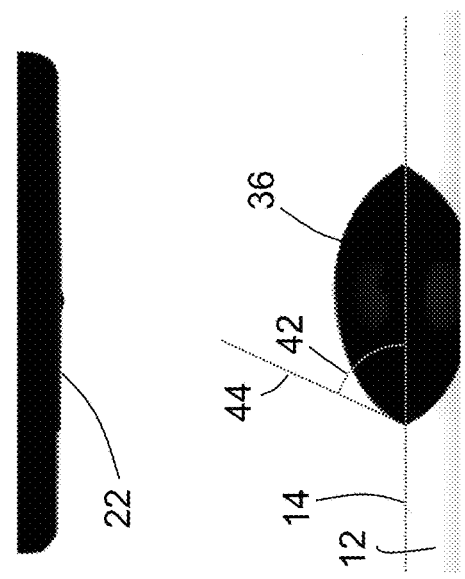
Fig. 2c
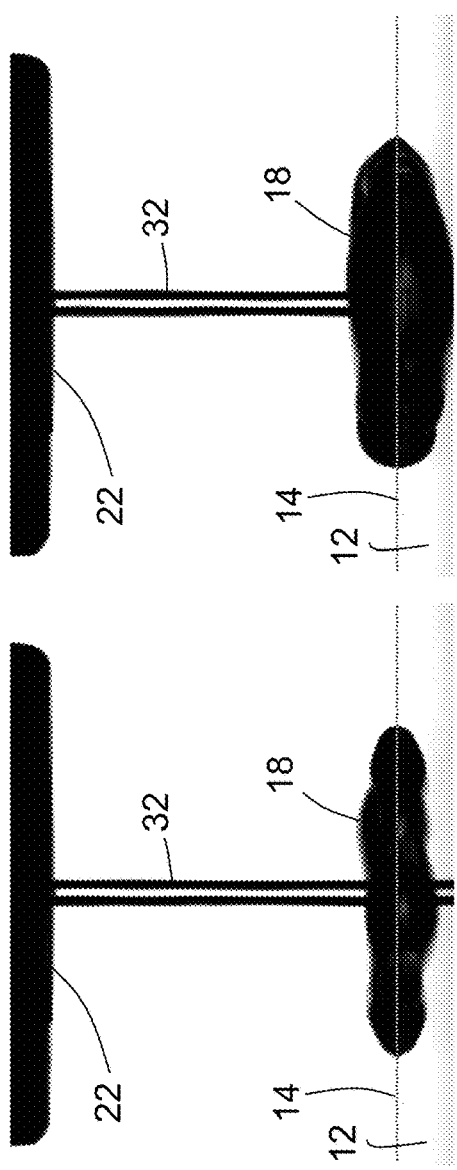
Fig. 2d
Fig. 2e
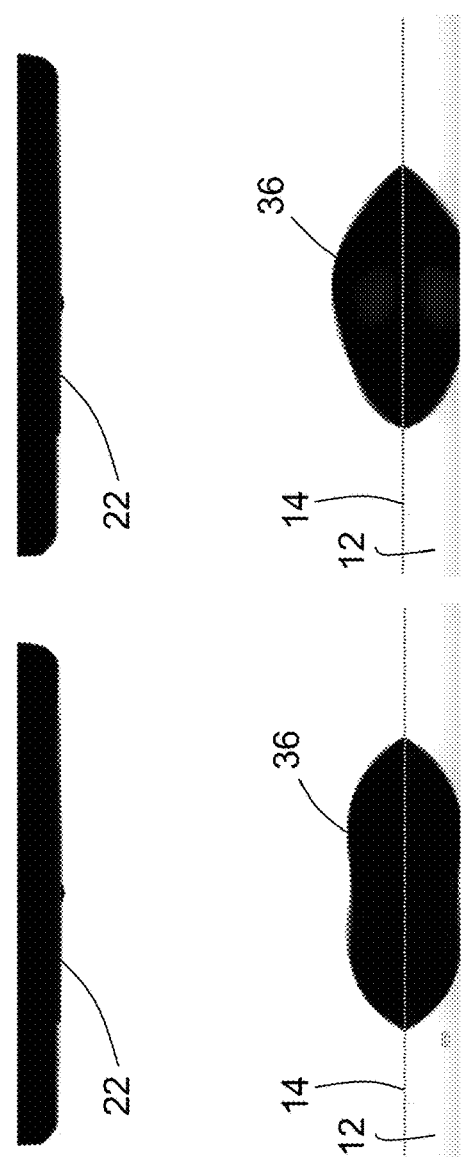
Fig. 2f

METHOD AND APPARATUS FOR MEASURING A RECEDING CONTACT ANGLE

CROSS REFERENCE TO RELATED INVENTION

This application is based upon and claims priority to, under relevant sections of 35 U.S.C. § 119, European Patent Application No. 21 181 439.7, filed Jun. 24, 2021, the entire contents of which are hereby incorporated by reference.

TECHNICAL FIELD

The following disclosure relates to a method and an apparatus for measuring a receding contact angle.

BACKGROUND

A contact angle between a solid surface and a liquid disposed on the surface is defined as the interior angle between the surface and a tangent to the liquid contour at a border between the solid surface and the liquid. When applying a liquid with known properties to a sample surface, the contact angle offers meaningful information on the characteristics of the sample surface. For this reason, measuring contact angles is a well-established technique in surface science. At the same time, measuring contact angles is a rather difficult process. To obtain reliable results, many factors need to be considered. The final shape of a liquid drop at rest does not only depend upon the surface energies of the liquid, the solid and the solid-liquid interface, but also upon the roughness of the surface and chemical or physical inhomogeneities such as e.g. adsorbed contaminants.

Another factor having significant impact on the measured contact angle of a drop at rest is how the liquid was applied to the surface. This is true because the interaction of the surface and the liquid also depends on the wetting dynamics as well as on the contact angle hysteresis, i.e. on whether the drop shape in static condition is the result of a wetting or a de-wetting process. When the liquid front advances over a previously dry surface such that a dry surface area is wetted by the liquid, a so-called advancing contact angle is formed. When the liquid recedes from a wetted surface, such that a wet surface area becomes dry, a so-called receding contact angle is formed. The advancing and the receding contact angles refer to angles measured under either dynamic or static conditions. When measured under static conditions, these terms describe the angles for the liquid that either recently advanced across a "dry" solid surface or receded from a wetted solid surface, respectively. Consequently, the terms recently advanced contact angle and recently retreated contact angle have been suggested to be the more appropriate terms, but the terms advancing and receding have been in use for several decades (see Huhtamäki, T., Tian, X., Korhonen, J. T. et al. Surface-wetting characterization using contact-angle measurements. Nat Protoc 13, 1521-1538 (2018). https://doi.org/10.1038/s41596-018-0003-z).

By definition, for a given interface between a surface and a liquid, the advancing contact angle is a maximum contact angle that may be observed, while the receding contact angle is a minimum contact angle that may be observed. Both the advancing and the receding contact angles, as well as the difference between both, the so-called contact angle hysteresis, offer important and very different types of information on the sample surface. Both contact angles describe a metastable contact angle, corresponding to local free-energy minima being in a higher energetic state than the most stable contact angle being in the global energetic minimum, the so called Young contact angle (see Huhtamäki, T. et al. cited above). The most important difference between the advancing and the receding contact angles is the fact that those are the result of either a wetting or a de-wetting process, respectively. Whereas the advancing and receding contact angles describe by definition the maximum and minimum contact angles, respectively, there are additional static contact angles possible which correspond to additional local energy minima. These are larger than the receding and smaller than the advancing contact angles according to their strict definitions. However, as those contact angles are also either the result of a wetting or a de-wetting process, they are herein referred to as advancing and receding contact angles. They provide valuable information as well.

A well-established method and device for measuring contact angles has become known from the document EP 0 919 801 A1. According to the known method, a drop of the liquid is formed at the tip of a cannula and transferred to a sample surface. This approach has long been considered a gold-standard. The contact angles observed with this method are commonly referred to as "static" or "equilibrium" contact angles. These generally lie between the advancing and the receding contact angles.

The document EP 2 899 528 B1 discloses another method and apparatus for measuring contact angles. It is based on a jet of pressurized liquid, applying the liquid to the surface as a continuous stream with a flow rate of 45 µl/s or less in order to keep the level of kinetic energy low. This process is sometimes referred to as "liquid needle". By this technique, it is possible to form a drop on the sample surface in a very short time, wherein the contact angles obtained are said to closely match the equilibrium contact angles. In fact, the contact angles measured according to this method represent advancing contact angles or recently advanced contact angles.

From the document US 2010/0024529 A1, a contact angle measurement technique applying "ballistic drop deposition" has become known. The known device dispenses a series of small volume-droplets of liquid to the same location of a sample surface, thereby constructing a drop of liquid on the surface. To prevent pinning of the leading edge of the growing volume of liquid by surface heterogeneities, each droplet imparts sufficient kinetic energy in the form of vibration. Thereby, the drop shall grow rapidly to its equilibrium dimensions, so that an equilibrium contact angle can be measured.

The document US 2020/008088 A1 discloses a method and test apparatus for determining a volume of a droplet of liquid. The method is based on a measurement of e.g. a height or a diameter of a drop disposed on a surface. Based on this measurement and based on a contact angle of the drop on the surface, which contact angle is not measured, but assumed to correspond to a known, characteristic contact angle, a volume of the drop is calculated.

The document EP 3 210 004 B1 discloses a method for measuring a "reduced" contact angle. Similar to the "ballistic drop deposition" method, a drop is formed from a series of small volume-droplets of liquid dispensed to the same location of a sample surface. Each droplet shall impart an amount of kinetic energy to the liquid drop sufficient to increase a perimeter of the drop beyond its equilibrium diameter. The drop perimeter is allowed to retract as the excess energy is dissipated, and a reduced contact angle shall be formed and measured.

Departing therefrom, it is an object of the invention to provide a method and an apparatus for measuring a receding contact angle.

BRIEF SUMMARY OF THE INVENTION

An embodiment of a method is provided for measuring a receding contact angle. The method includes forming a drop of a liquid on a sample surface by applying the liquid to the sample surface as a continuous jet having a flow rate. The liquid is ejected through an opening having an opening diameter for a defined dosing time, thereby defining a dosing volume. At least one geometrical parameter of the of the drop formed on the sample surface is measured. A contact angle between the sample surface and the drop is determined based on the at least one geometrical parameter. The flow rate and the dosing time are selected such that the dosing volume does not exceed the flow rate multiplied with 0.11 s.

The liquid may be any liquid suitable for analysing the interaction with the sample, in particular water or diiodomethane. The opening through which the liquid is ejected may be circular in cross-section. In particular, the opening may be a nozzle opening. The jet has a defined length corresponding to the dosing time. It extends between a front end and a rear end, preferably without interruption. In particular, it is foreseen to apply only a single jet for forming the entire drop.

After the drop has been formed on the surface and has reached a static condition, usually within milliseconds after the rear end of the jet has reached the surface, the at least one geometrical parameter is measured, for example a diameter, a height, or a shape of a drop contour, etc. This may be done for example with an optical means such as a camera, in particular either in top view or in side view. As is known in the art, it is possible to determine a contact angle on this basis, for example by simply drawing a tangent to a drop contour (in particular when the drop is imaged with a camera in side view), and/or by applying a mathematical algorithm assuming a certain drop shape, for example a known volume and spherical shape.

As discussed above with reference to the document EP2899528B1, applying the liquid to the sample surface as a continuous jet is a proven method for forming a drop exhibiting an advancing contact angle. The invention is based on the inventors' insight that a drop exhibiting a receding contact angle can be formed with a continuous jet as well, provided that several conditions are met: First, the continuous jet should be applied such that the surface area initially wetted by the liquid is larger than the surface area wetted by the drop after the same has reached its equilibrium state, because only then a proper receding process can take place. Second, the surface area initially wetted should be contiguous, because otherwise the liquid will likely split in multiple drops, for example in two or more drops of comparable size, or in one larger drop and one or more smaller "satellite" drops. This will make it difficult or even impossible to reliably measure the geometrical parameter. The first condition seems to demand a relatively fast/energetic jet, while the second condition seems to demand a relatively slow, cautious process.

Based on extensive experimental studies, the inventors realised that both partly contradictory conditions can be met simultaneously when for a given flow rate of the jet, the dosing time is controlled such that the dosing volume does not exceed an upper limit $V_{max}$ given by the formula:

$$V_{max}[\mu l]=0.11 \; s*\text{flux} \; [\mu l/s] \tag{1}$$

The term flux refers to the flow rate of the continuous jet, measured in μl/s. Surprisingly, drops exhibiting a receding contact angle can be formed over a wide range of flow rates as long as the dosing time is kept short enough so that the dosing volume does not exceed the above maximum volume. If a longer dosing time was used, the formation of the drop would be to slow to allow for a proper receding process. The drop would rather exhibit an advancing contact angle.

The inventors found that when applying the limit of equation (1), drops exhibiting a receding contact angle can be formed in a reliable manner for a large variety of liquid/surface combinations. In some situations, in particular for some sample surface/liquid combinations, it may be helpful to apply a lower value for the upper limit Vmax, in particular using a factor of 0.10, 0.08, 0.06 or even 0.04 instead of the factor 0.11 in equation (1). As will be discussed later, this may lead to an even more pronounced receding-process, and to an even more stable and reliable measurement of the receding angle. It is understood that for practical reasons, additional limitations apparent to the one skilled in the art may apply. In particular, the flow rate may need some adjustment based on the opening diameter and the properties of the liquid to ensure that a continuous jet is created.

In summary, the inventive method allows for a fast and reliable deposition of drops exhibiting a receding contact angle. In particular, the method can be performed rapidly without moving parts (such as a cannula that needs to be lowered very carefully to the surface) and if desired in a fully automated manner.

According to an embodiment, the maximum sample surface area wetted during drop formation is at least 6% larger than the sample surface area wetted by the drop once the drop has reached a static condition. In further aspects, the maximum sample surface area wetted during drop formation is at least 10% or at least 20% larger than the sample surface area wetted by the drop once the drop has reached a static condition. This means the liquid initially spreads over a larger surface area until the liquid front on the surface recedes towards its equilibrium position. Experimental studies have shown that when meeting the above degree of wetted surface area decrease, drops exhibiting receding contact angles virtually identical to receding contact angles measured with standard techniques can be created.

According to an embodiment, the drop formed on the sample surface after having reached a static condition has a drop diameter in a range of 150% to 490% of the opening diameter, in particular in a range of 200% to 400% of the opening diameter. These values apply in particular to a drop having a contact angle of about 90°. The opening diameter determines the diameter of the jet, hence the above criterion means a relatively thick jet forms a relatively small drop. The drop is less than 5 times larger as the jet is wide. Experimental data suggest that the process in this way can be carried out very fast and very reliably, which may be founded in that a relatively high flow rate can be obtained with relatively low flow velocities.

According to an embodiment, the flow rate is selected in a range between 20 μl/s and 800 μl/s, in particular in a range between 46 μl/s and 650 μl/s, in particular in a range between 300 μl/s and 500 μl/s. As discussed above, a large range of flow rates is suitable. Best results have been obtained in the given ranges.

According to an embodiment, the dosing time is selected such that the dosing volume is in a range between 0.1 μl and 15 μl, in particular in a range between 0.2 μl and 5 μl. These dosing volumes correspond to drops ideally suited for measuring receding contact angles, because the drops are small enough so that gravitational forces can be neglected while they are stable for a sufficient time to measure the at least one geometrical parameter.

According to an embodiment, the opening diameter is in a range between 0.05 mm and 0.5 mm, in particular in a range between 0.11 mm and 0.4 mm, in particular in a range between 0.15 mm and 0.35 mm. Although it is possible to use openings with other diameters as well, it was found that in particular within the given ranges, continuous jets with suitable properties for forming drops exhibiting a receding contact angle can be obtained with readily available hardware for various surfaces and liquids.

According to an embodiment, the liquid is ejected from a liquid reservoir in which a defined dosing pressure is maintained. In general, the liquid jet can be formed with any suitable dosing technology, for example based on an actuator-driven syringe mechanism. A pressurized liquid reservoir, however, may facilitate creating a smooth, homogeneous, uninterrupted jet. The liquid reservoir may be a relatively large volume containing a liquid supply/the entire liquid supply sufficient for a large number of drops. However, the liquid reservoir in which the dosing pressure is controlled may also be a certain sub-volume of the available liquid supply, for example arranged in a liquid line. Maintaining the dosing pressure within the liquid reservoir can be done for example with a volume of pressurized gas arranged in or coupled to the liquid reservoir, in particular within a separate, deformable gas container within the liquid reservoir. The formation of the jet, in particular the dosing time, may be controlled by means of a control valve arranged between the liquid reservoir and the opening through which the liquid is ejected, the control valve arranged for example in a liquid line connecting these elements.

According to an embodiment, the dosing pressure is controlled in a range between 100 mbar and 2000 mbar, in particular in a range between 200 mbar and 800 mbar. It was found that well-defined liquid jets with properties well-suited for forming drops exhibiting a receding contact angle can be obtained within these dosing pressure ranges.

According to an embodiment, the liquid applied to the surface forms a single drop on the surface, the drop exhibiting a receding contact angle. As explained above, it is preferred to control the drop forming process such that a formation of more than one drop, e.g. of one or more additional small satellite drops is avoided, in order to facilitate a reliable, preferably automated measurement of the at least one geometrical parameter.

An embodiment of an apparatus for measuring a receding contact angle is further provide. The apparatus includes a liquid reservoir and a dosing means or dosing device configured to apply the liquid to a sample surface as a continuous jet having a flow rate. The liquid is ejected through an opening having an opening diameter for a defined dosing time, thereby defining a dosing volume. A contact angle measuring means or device is configured to measure at least one geometrical parameter of the drop formed on the sample surface and configured to determine a contact angle between the sample surface and the drop based on the at least one geometrical parameter. The dosing means is configured to control the dosing time such that the dosing volume does not exceed the flow rate multiplied with 0.11 s.

As to the features and advantages of the apparatus, also in view of the aspects given below, reference is made to the description of the method which equally applies to the apparatus. The apparatus may be configured as stand-alone device including a controller which controls the dosing means and/or the contact angle measurement means. However, one or more of these functions may be implemented in a separate control device, such as in a personal computer connected to the device.

According to an embodiment, the apparatus comprises a liquid line connecting the liquid reservoir and the opening, a valve arranged in the liquid line, a liquid pressurizing means or device for setting a liquid in the liquid reservoir under a dosing pressure, wherein the dosing means is adapted to define the dosing time by opening and closing the valve.

According to another embodiment, the dosing means is configured to apply the continuous jet with a flow rate in a range between 20 µl/s and 800 µl/s, in particular in a range between 46 µl/s and 650 µl/s, in particular in a range between 300 µl/s and 500 µl/s. In another embodiment, the dosing means is configured to control the dosing time such that the dosing volume is in a range between 0.1 µl/s and 15 µl/s, in particular in a range between 0.2 µl and 5 µl.

According to an embodiment, the opening diameter is in a range between 0.05 mm and 0.5 mm, in particular in a range between 0.11 mm and 0.4 mm, in particular in a range between 0.15 mm and 0.35 mm. According to another embodiment, the dosing means is adapted to control the dosing pressure in a range between 100 mbar and 2000 mbar, in particular in a range between 200 mbar and 800 mbar.

BRIEF DESCRIPTION OF THE DRAWINGS

In the following, the invention is explained in greater detail with reference to the drawings:

FIG. 2a illustrates a first still image of a high-speed video of a first drop-forming process;

FIG. 2b illustrates a second still image of a high-speed video of a first drop-forming process;

FIG. 2c illustrates a third still image of a high-speed video of a first drop-forming process;

FIG. 2d illustrates a fourth still image of a high-speed video of a first drop-forming process;

FIG. 2e illustrates a fifth still image of a high-speed video of a first drop-forming process;

FIG. 2f illustrates a sixth still image of a high-speed video of a first drop-forming process;

DETAILED DESCRIPTION OF THE INVENTION

Figure 1:
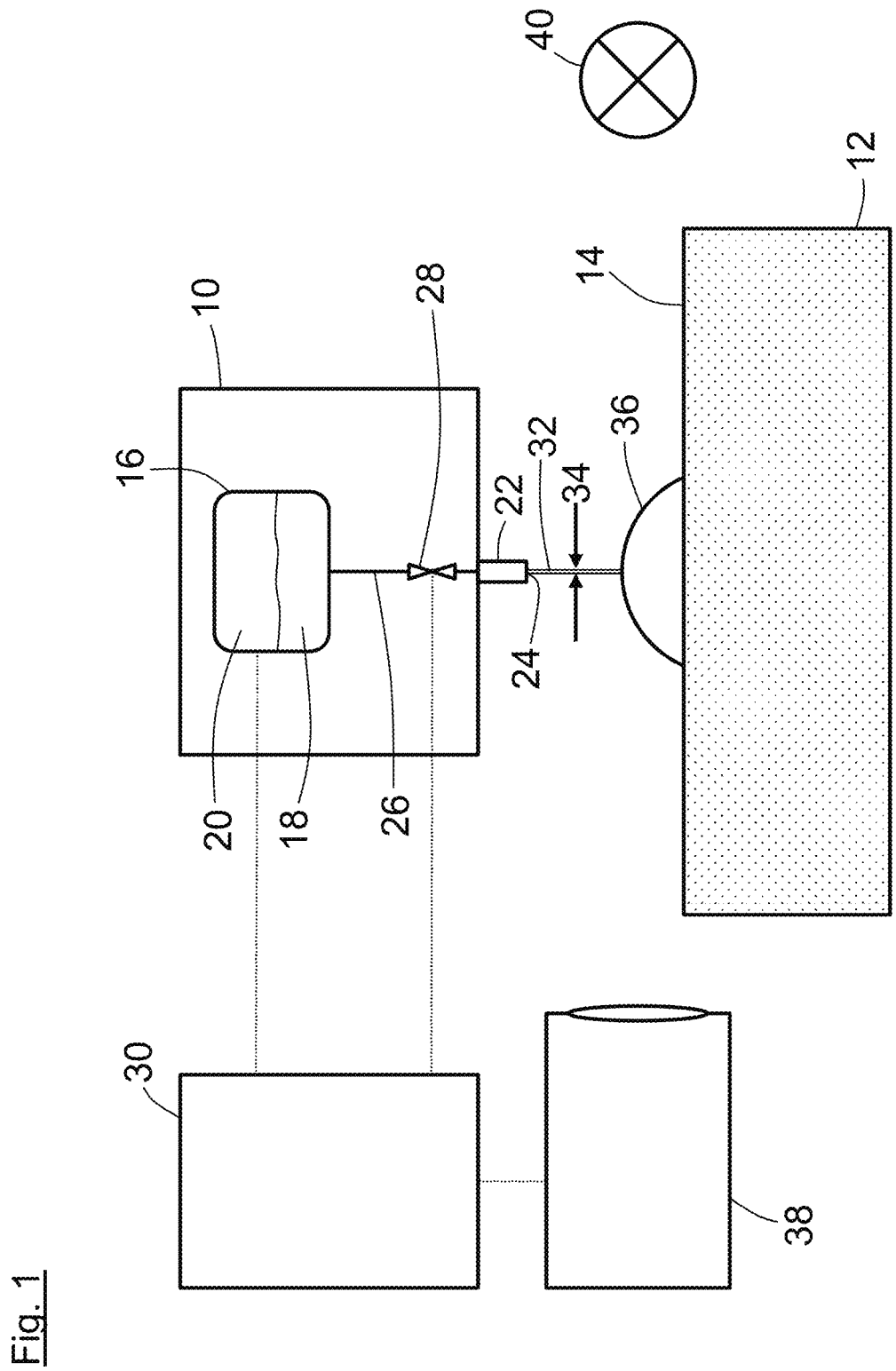
FIG. 1 schematically illustrates an embodiment of an apparatus for measuring a receding contact angle.

The apparatus of FIG. 1 comprises a dosing means or a dosing device 10 located at a defined position with reference to a surface 14 of a sample 12. The dosing device 10 has a liquid reservoir 16 which is filled with a liquid 18. Within the liquid reservoir 16, above the liquid 18, a volume of pressurised gas 20 is present. Although not shown, a separate, deformable container containing the pressurised gas 20 or the liquid 18 can be provided within the liquid reservoir 16 to ensure separation between the different fluids.

Facing the surface 14, the dosing device 10 comprises a nozzle 22 with an opening 24 having a diameter. The nozzle 22 and the opening 24 are connected to the liquid reservoir 16 by a liquid line 26 which includes a control valve 28. A controller 30 is connected to the control valve 28 and adapted to open and close the control valve 28 in order to control the ejection of liquid 18 through the opening 24. In FIG. 1, the controller 30 is shown next to the dosing device 10, but it may be integrated into a common housing as well. A connection shown as a dotted line between the controller 30 and the liquid reservoir 16 indicates that the controller 30 may be adapted to also control the dosing pressure maintained in the liquid reservoir.

As soon as the control valve 28 is opened, liquid 18 is ejected through the opening 24 as a continuous jet 32 of liquid 18, the jet 32 having an almost constant width or a constant width 34 illustrated by the two arrows. The width 34 is determined by the diameter of the opening 24. The jet 32 has a defined flow rate which is determined by several factors, including the diameter of the opening 24, the dosing pressure, the viscosity of the liquid 18, and the length and diameter of the liquid line 26. The jet 32 is directed towards the surface 14 and forms a drop 36 on the surface 14. The size of the drop 26 is exaggerated in FIG. 1, in reality after having reached a static condition (see FIGS. 2 and 3) the drop 34 has a diameter preferably less than 5 times the width 34 of the jet 32.

After a predetermined dosing time, the controller 30 closes the control valve 28 again, so that a defined dosing volume has been applied, which can be calculated by multiplying the flow rate with the dosing time.

The apparatus of FIG. 1 further comprises a contact angle measurement means or device including a camera 38 and a light source 40. The camera 38 and/or the light source 40 are controlled by the controller 30 and are arranged on opposite sides of the drop 36, so that images of the drop 36 in side view can be acquired. Based on these images, a receding contact angle of the drop 36 can be determined basically by measuring this angle directly within the side view images (see FIG. 2). However, this is just one example of a geometrical parameter suitable for determining the contact angle. It is noted that the contact angle measurement means of FIG. 1 is just a non-limiting example, the dosing means 10 of this apparatus can be combined with any other contact angle measurement means.

FIGS. 2a-f illustrate the drop-forming process by means of a jet 32 applying the liquid 18 to a surface 14 of a sample 12 using an apparatus as shown in FIG. 1. Six consecutive images shown in FIGS. 2a to 2f selected from a high-speed video showing the drop-forming process in side view. At the top of each image, one can see the lower end of the nozzle 22 having the opening 24 (FIG. 1). At the bottom of each image, one can see the sample 12 with the surface 14 indicated by a dotted line. Due to the reflective properties of the surface 14, a mirror image of the liquid 18/the drop 36 can be seen below the dotted line.

FIG. 2a shows a point in time shortly after the control valve 28 (FIG. 1) was opened and the jet 32 has reached the surface 14, where a first amount of liquid 18 initially forms a relatively wide-spread, flat shape on the surface 14. At this point in time, the control valve (FIG. 1) 28 is still open and the jet 32 continues to flow out of the opening 24 (FIG. 1) in the nozzle 22 (FIG. 1). One can nicely see that the jet 32 has a constant width until it reaches the surface 14.

In FIG. 2b, the control valve 28 (FIG. 1) is still open and the jet 32 continues to apply liquid 18 to the surface 14. The volume of the still wide-spread, flat shape on the surface is increasing.

In FIG. 2c, the control valve 28 has been closed after the dosing time is over, and a rear end of the jet 32 has reached the surface 14 already. At this point in time, the full dosing volume of liquid 18, i.e. the drop 36, is arranged on the surface 14, but the liquid 18 is still in motion and the shape of drop 36 changes. This can also be appreciated in FIGS. 2d and 2e. One can see that the surface area of the surface 14 wetted by the drop 36 decreases while the perimeter of the drop 36 is receding.

In FIG. 2f, the drop 36 has reached its equilibrium state. This occurred as a result of a de-wetting process, so the drop 36 exhibits a receding contact angle 42, which is identified in the image between the surface 14 and a tangent 44 to the contour of the drop 36 drawn at the perimeter of the drop 36.

Figure 3A:
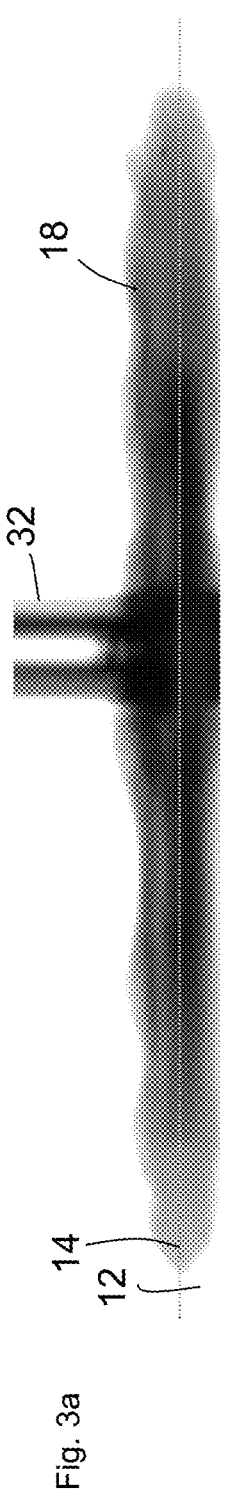
FIG. 3a illustrates a first still image of a high-speed video of a second drop-forming process.
Figure 3B:
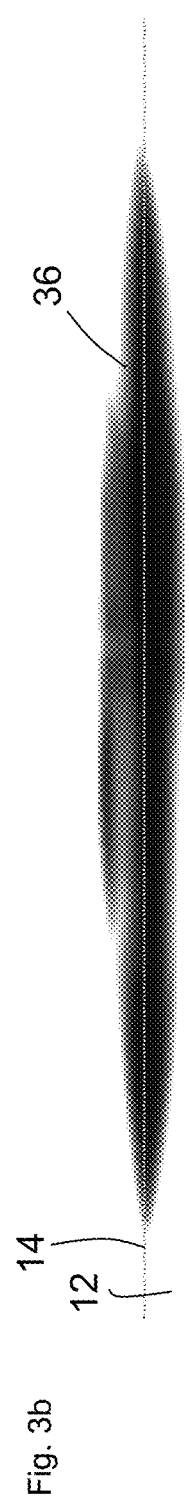
FIG. 3b illustrates a second still image of a high-speed video of a second drop-forming process.
Figure 3C:
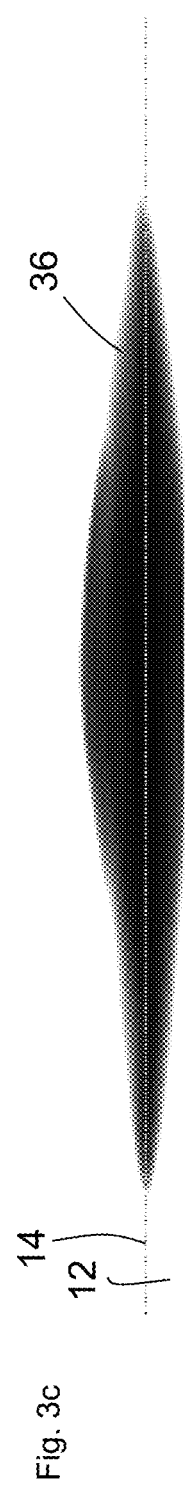
FIG. 3c illustrates a third still image of a high-speed video of a second drop-forming process.
Figure 3D:
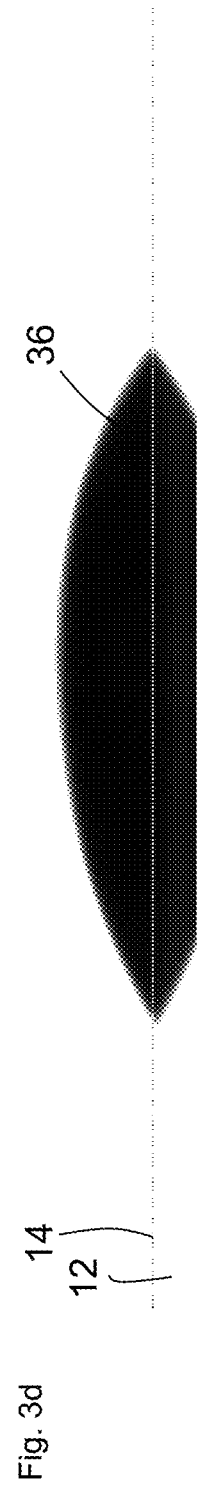
FIG. 3d illustrates a fourth still image of a high-speed video of a second drop-forming process.
Figure 3E:
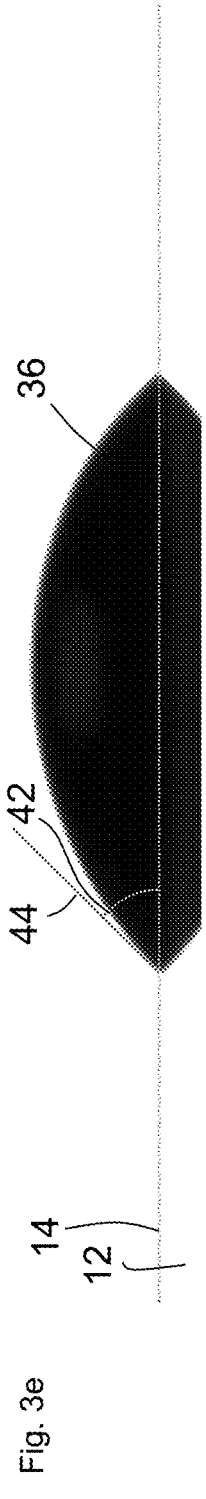
FIG. 3e illustrates a fifth still image of a high-speed video of a second drop-forming process.

FIGS. 3a-e show a series of five images of another (a second) drop forming-process, wherein each image shows a small section of the surface 14 only, also in side view. In this example, the receding contact angle 42 of the drop 36 is smaller than in FIG. 2f, and the initial spread of the shape is even wider than in FIG. 2a, so that a more pronounced receding of the drop 36 takes place until the equilibrium state shown in FIG. 3e is reached.

Figure 4:
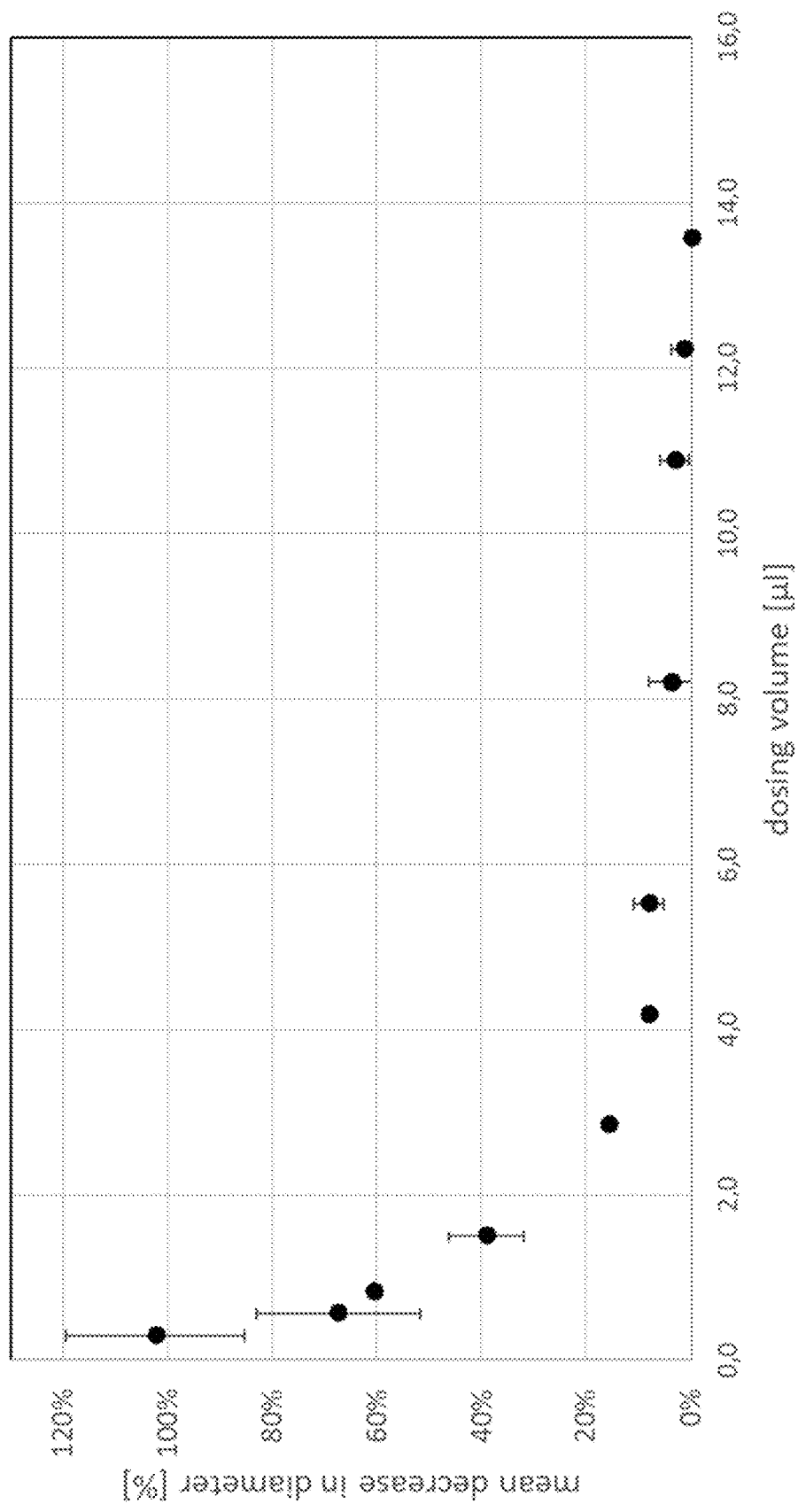
FIG. 4 is a diagram showing the decrease in diameter observed for one liquid/surface combination depending on the dosing volume.

FIG. 4 shows a diagram of the results of various drop dosing-processes carried out for the same surface/liquid combination, namely a silicon wafer in combination with water. A nozzle 22 having an opening diameter of about 0.2 mm was used with a fixed dosing pressure of about 350 mbar, leading to a constant flow rate of the jet 32. The dosing time was varied controlling the timing of opening and closing of the control valve 28. On the x-axis, the dosing volume is indicated, which is proportional to the dosing time. For each dosing process, a high-speed video similar to the illustrations of FIGS. 2a-f and 3a-e was taken, and the maximum diameter of the wetted area (when the jet 32 has just fully reached the surface 14) and the final diameter of the drop 36 in its equilibrium state were measured. Dividing the difference between the maximum and the final diameter by the final diameter renders the relative decrease in diameter indicated on the y-axis. Each data point represents a mean value of a number of experiments carried out with the same dosing time.

Data show that for small dosing volumes, a strong decrease in diameter can be observed, as illustrated by FIG. 4. When the dosing volume is increased, the relative decrease in diameter decreases. For dosing volumes lager than about 12 µl, no significant decrease in diameter can be observed, so that the drops formed no longer exhibit receding contact angles.

Figure 5:
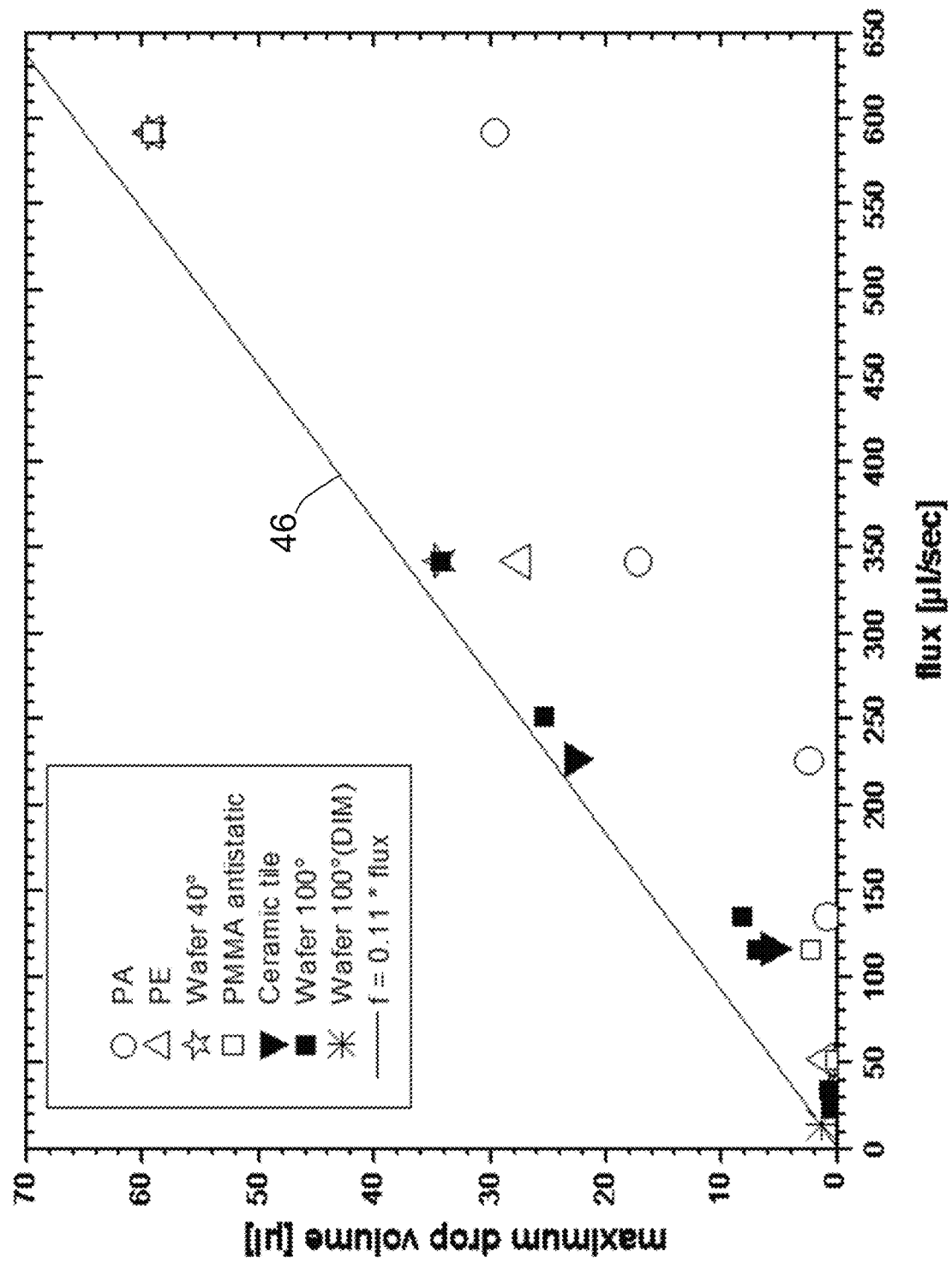
FIG. 5 is a diagram showing the maximum drop volume depending on the flow rate of a liquid jet for various surface/liquid combinations.

It was found that the maximum dosing volume for which a sufficient decrease in diameter occurs over a large range of surface/liquid combinations depends on the flow rate of the jet 32. In this regard, FIG. 5 shows additional experimental data. Each data point represents a specific liquid/surface combination. The sample materials covered are indicated in the legend and include different plastics such as PA (polyamide), PE (polyethylene), PMMA (methyl methacrylate), different wafers and a ceramic tile. The liquid used was water except for one data point, where it was diiodomethane (DIM). For each liquid/surface combination, a series of measurements was carried out similar to the one shown in FIG. 4, and a maximum drop volume was determined for which no significant decrease in diameter was observed. These maximum drop volumes are depicted in FIG. 5. This means that for each data point shown in FIG. 5, several measurements were made with drop volumes just below the depicted maximum drop volume. For these, a significant decrease in mean diameter was seen. An upper limit corresponding to the maximum volume Vmax of equation (1) is drawn as a line 46. For dosing times leading to dosing volumes larger than this upper limit, no receding contact angles have been observed.

Figure 6:
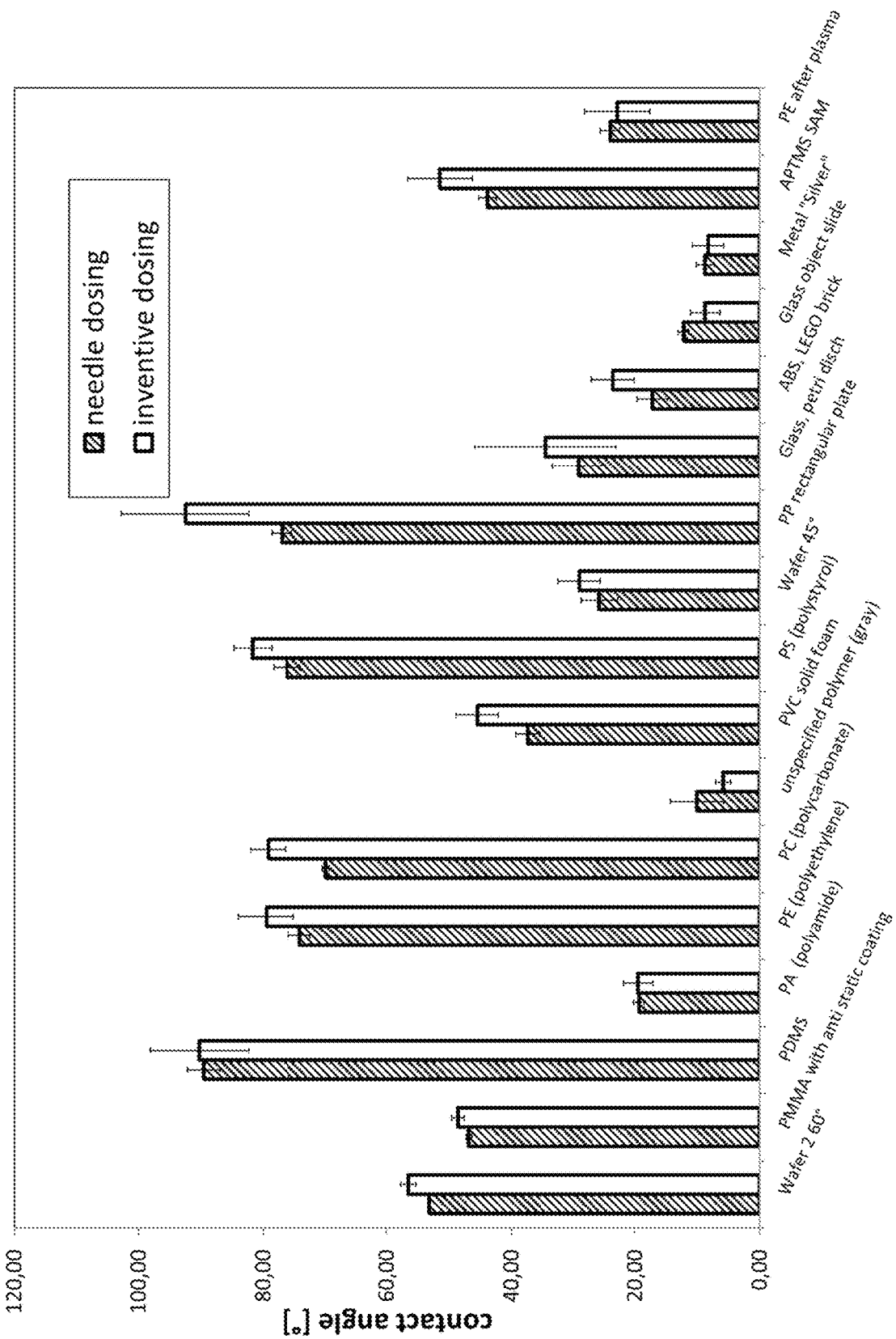
FIG. 6 is a diagram comparing water receding contact angles of various liquid/surface combinations using different measurement techniques.

FIG. 6 shows contact angles for various surface/liquid combinations (surface materials: as indicated in the diagram, liquid: water). The receding contact angles (y-axis) observed when applying the inventive method are shown as white bars. The hatched bars indicate the receding contact angles when a conventional method was used. This conventional method uses a needle lowered onto the surface for applying a drop, followed by sucking in a part of the liquid through the needle to enforce a receding process of the drop's perimeter. Details on this conventional method can be found in the above-cited document of Huhtamäki, T. et al. The error bars indicate the standard deviation from mean value obtained from several different measurements for each surface/liquid combination.

The comparison shows that both methods lead to almost identical results for all of the samples. While the measurement of one receding contact angle with the conventional method typically takes about 15 to 20 minutes, the inventive method can be carried out within a few seconds or less, if desired.

For the measurements shown in FIG. 6, an opening diameter of 0.3 mm was combined with flow rates in the range between 200 µl/s and 400 µl/s. Drop volumes were in a range of 0.35 µl to 1 µl. The dosing pressure was in a range of 250 mbar to 400 mbar.

Applying a dosing pressure of 1500 mbar on a dosing valve having an opening with diameter of 0.2 mm to dose water droplets in the volume range of 1 µl to 6 µl was found to provide receding contact angles being, within the experimental uncertainty, the same as when measured using the traditional needle-in drop method. However, depending on the substrate, it was found that openings with only 0.2 mm diameter or less and larger pressures can result in enhanced satellite-droplet formation hampering an automated image analysis.

In other measurements, drops exhibiting receding contact angles were successfully applied to various surfaces through openings of 0.1 mm, 0.2 mm and 0.3 mm in combination with dosing pressures of 250 mbar, 350 mbar and 700 mbar. These parameters lead to the following flow rates:

|  | 0.1 mm | 0.2 mm | 0.3 mm |
| --- | --- | --- | --- |
| 250 mbar | 23.7 µl/s | 115.3 µl/s | 251.4 µl/s |
| 350 mbar | 33.6 µl/s | 134.1 µl/s | 341.6 µl/s |
| 700 mbar | 51.3 µl/s | 225.7 µl/s | 591.5 µl/s |

LIST OF REFERENCE NUMERALS 10 dosing means
12 sample
14 surface
16 liquid reservoir
18 liquid
20 pressurised gas
22 nozzle
24 opening
26 liquid line
28 control valve
30 controller
32 jet
34 width
36 drop
38 camera
40 light source
42 receding contact angle
44 tangent
46 line

The invention claimed is:

1. A method for measuring a receding contact angle between a sample surface and a drop of a liquid, the method comprising:
ejecting a dosing volume of the liquid from an opening onto the sample surface, wherein the liquid is ejected as a continuous jet at a defined flow rate for a defined dosing time period, wherein the opening comprises an opening diameter;
allowing the dosing volume of the liquid to form a drop on the sample surface;
measuring at least one geometrical parameter of the drop formed on the sample surface; and
determining the receding contact angle between the sample surface and the drop based on the at least one geometrical parameter,
wherein the flow rate and the dosing time period are selected such that the dosing volume does not exceed the flow rate multiplied by 0.11 s.

2. The method of claim 1, further comprising wetting a surface area of the sample surface with the ejected dosing volume that is at least 6% larger than a surface area wetted by the drop formed on the sample surface.

3. The method of claim 1, wherein the drop formed on the sample surface comprises a drop diameter in a range of 150% to 490% of the opening diameter.

4. The method of claim 1, wherein the flow rate is between 20 µl/s and 800 µl/s.

5. The method of claim 1, wherein the dosing time is selected such that the dosing volume is in a range between 0.1 µl and 15 µl.

6. The method of claim 1, wherein the opening diameter is between 0.15 mm and 0.35 mm.

7. The method of claim 1, wherein the liquid is ejected from a liquid reservoir, and wherein a dosing pressure is maintained in the liquid reservoir.

8. The method of claim 7, wherein the dosing pressure is in a range between 100 mbar and 2000 mbar.

9. An apparatus for measuring a receding contact angle between a sample surface and a drop of a liquid, comprising:
a liquid reservoir;
a dosing device configured to apply a dosing volume of the liquid to the sample surface as a continuous jet having a flow rate, wherein the liquid is ejected through an opening having an opening diameter for a defined dosing time; and a contact angle measuring device configured to measure at least one geometrical parameter of the drop of the liquid formed on the sample surface and configured to determine the receding contact angle between the sample surface and the drop of the liquid based on the at least one geometrical parameter, wherein the dosing device is configured to control the dosing time such that the dosing volume does not exceed the flow rate multiplied with 0.11 s.

10. The apparatus of claim 9, further comprising:
a liquid line configured to connect the liquid reservoir and the opening;
a control valve positioned along the liquid line; and
a liquid pressurizing device configured to pressurize the liquid in the liquid reservoir at a dosing pressure,
wherein the dosing device is configured to open and close the control valve,
wherein the opening and closing of the control valve defines the dosing time.

11. The apparatus of claim 9, wherein the dosing device is configured to apply the continuous jet with the flow rate in a range between 20 µl/s and 800 µl/s.

12. The apparatus of claim 9, wherein the dosing device is configured to control the dosing time such that the dosing volume is in a range between 0.1 µl and 15 µl.

13. The apparatus of claim 9, wherein the opening diameter is between 0.05 mm and 0.5 mm.

14. The apparatus of claim 9, wherein the dosing device is configured to regulate a pressure of the liquid in a range between 100 mbar and 2000 mbar.

* * * * *